(12) United States Patent
Toyama

(10) Patent No.: US 9,898,463 B2
(45) Date of Patent: Feb. 20, 2018

(54) DOCUMENT MANAGEMENT SERVER, DOCUMENT MANAGEMENT METHOD, AND NON-TRANSITORY STORAGE MEDIUM STORING PROGRAM

(71) Applicant: CANON KABUSHIKI KAISHA, Tokyo (JP)

(72) Inventor: Masaki Toyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 243 days.

(21) Appl. No.: 14/298,611

(22) Filed: Jun. 6, 2014

(65) Prior Publication Data

US 2014/0365543 A1 Dec. 11, 2014

(30) Foreign Application Priority Data

Jun. 7, 2013 (JP) ................................ 2013-120719

(51) Int. Cl.
G06F 17/30 (2006.01)
(52) U.S. Cl.
CPC .............................. *G06F 17/30011* (2013.01)
(58) Field of Classification Search
CPC ......... G06F 17/30247; G06F 17/30876; G06F 21/78; G06F 21/80; G06F 17/30047; G06F 17/30011
See application file for complete search history.

(56) References Cited

U.S. PATENT DOCUMENTS

| 7,761,497 | B1* | 7/2010 | O'Connell, Jr. | G06F 17/30902 709/201 |
| 2005/0165747 | A1* | 7/2005 | Bargeron | G06F 17/30011 707/999.003 |
| 2006/0048043 | A1* | 3/2006 | Kikuchi | G06F 17/2235 715/205 |
| 2006/0262976 | A1* | 11/2006 | Hart | G06F 17/30247 382/190 |

(Continued)

FOREIGN PATENT DOCUMENTS

| JP | H09-198296 A | 7/1997 |
| JP | H10-021134 A | 1/1998 |

(Continued)

*Primary Examiner* — Carol Choi
*Assistant Examiner* — Yuk Ting Choi
(74) *Attorney, Agent, or Firm* — Canon U.S.A., Inc. IP Division

(57) ABSTRACT

A document management server includes: a generation unit configured to generate, by using a request received from a client, a character string for identifying a requested document; a determination unit configured to determine whether or not an image file of the document exists in a location represented by the character string by performing a check using the character string; a storage unit configured to, in a case that the determination unit determines that no image file of the document exists in the location, acquire an entity file of the document, generate an image file of the document by using the acquired entity file, and store, as cache data, the generated image file in the location; an acquisition unit configured to, in a case that the determination unit deter- (Continued)

mines that an image file of the document exists in the location, acquire the image file of the document existing in the location.

6 Claims, 13 Drawing Sheets

(56) References Cited

U.S. PATENT DOCUMENTS

| | | | | |
|---|---|---|---|---|
| 2007/0223013 A1* | 9/2007 | Mizutani | ............ | H04N 1/00132 |
| | | | | 358/1.2 |
| 2008/0077996 A1* | 3/2008 | Kubo | .................. | G06F 21/6218 |
| | | | | 726/27 |
| 2013/0110832 A1* | 5/2013 | Wood | ................ | G06F 17/30203 |
| | | | | 707/736 |

FOREIGN PATENT DOCUMENTS

| | | | |
|---|---|---|---|
| JP | 2000-076257 | A | 3/2000 |
| JP | 2004304446 | A | 10/2004 |
| JP | 2005-222237 | A | 8/2005 |
| JP | 2008293397 | A | 12/2008 |

\* cited by examiner

FIG. 8

CCC\DDD-EEE-FFF\201210250945
→| 801 |←
|← 802 →|← 803 →|

FIG. 10

```
CCC\DDD\EEE\FFF\201210250945
     →|1001|←
        →|1002|←
            →|1003|←
→| 801 |←         |←      803      →|
```

DOCUMENT MANAGEMENT SERVER, DOCUMENT MANAGEMENT METHOD, AND NON-TRANSITORY STORAGE MEDIUM STORING PROGRAM

BACKGROUND OF THE INVENTION

Field of the Invention

The present invention relates to a document management server that manages documents, a document management method, and a non-transitory storage medium storing a program.

Description of the Related Art

In a document management system constituted by a document management server and a plurality of clients, the server receives a request from a client and transmits information on a requested document to the client. There is also a system disclosed in Japanese Patent Laid-Open No. 2005-222237 in which a server generates image data (display data) of a requested document and transmits the image data to a client so that the image data is displayed, thereby enabling the content of the document to be displayed in a general-purpose browser of the client.

In such a document management system, there is a case where a document management server repeatedly receives requests for the same document from a plurality of clients. In order to deal with this, it is considered that a function configured to accumulate image data of this document as reusable data (hereinafter referred to as cache data) is provided in the server so as to enable quick responses to requests for the same document.

In a system disclosed in Japanese Patent Laid-Open No. 2000-076257, cache data of an information entity is accumulated so that the cache data may be searched for by using meta information, and it may also be detected whether or not the cache data of the information entity has already been accumulated by using a meta information table in which the meta information is stored.

However, as in Japanese Patent Laid-Open No. 2000-076257, a technique of referring to cache data by using a table requires an area for storing the table, thereby resulting in consumption of physical resources (hereinafter referred to as resources).

Also, every time new image data generated in response to a request from a client is stored as cache data, the table has to be updated, and thus this may have some effect on the speed of a process of responding to a client.

In addition, a procedure is performed in which it is checked whether or not applicable meta information exists within the meta information table, and when the meta information exists, cache data is searched for by using cache data storage location information written in the meta information so as to acquire the cache data. Hence, it takes some time to check the presence or absence of cache data.

SUMMARY OF THE INVENTION

A document management server includes: a generation unit configured to generate, by using a request received from a client, a character string for identifying a requested document; a determination unit configured to determine whether or not an image file of the document exists in a location represented by the character string by performing a check through a cache data storage area by using the character string; a storage unit configured to, in a case that the determination unit determines that no image file of the document exists in the location, acquire an entity file of the document, generate an image file of the document by using the acquired entity file, and store, as cache data, the generated image file in the location; an acquisition unit configured to, in a case that the determination unit determines that an image file of the document exists in the location, acquire the image file of the document existing in the location; and a transmission unit configured to transmit the acquired image file to the client.

Further features of the present invention will become apparent from the following description of exemplary embodiments with reference to the attached drawings.

BRIEF DESCRIPTION OF THE DRAWINGS

FIG. 8 illustrates an example of a character string for identifying a document in a folder hierarchy.

FIG. 10 illustrates another example of a character string for identifying a document in a folder hierarchy.

DESCRIPTION OF THE EMBODIMENTS

First Embodiment

Figure 1:
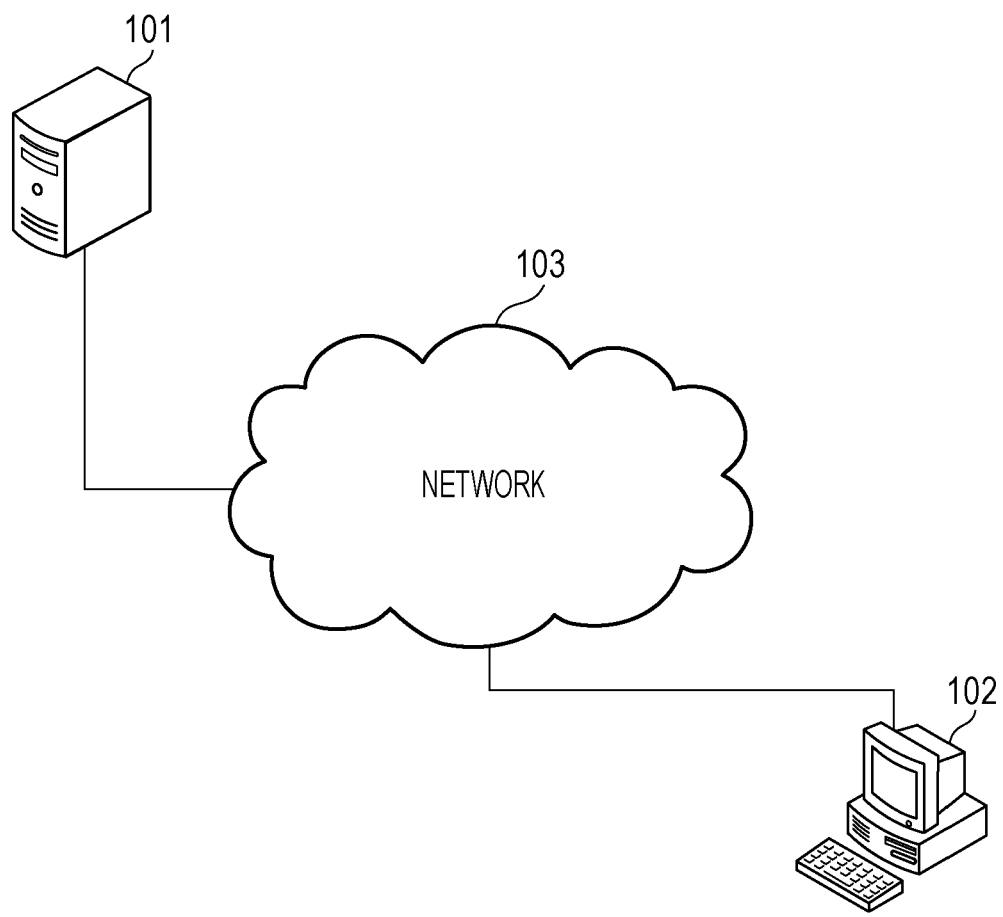
FIG. 1 illustrates a system configuration.

FIG. 1 is a schematic view illustrating a system configuration according to a first embodiment. In FIG. 1, a document management server 101 provides typical document management services, such as document storage and document searches. A client personal computer (PC) 102 executes a document management client application for using the document management services provided by the document management server 101. In this embodiment, the document management client application is an application that runs on various operating systems, such as Microsoft Windows (registered trademark) and Linux (registered trademark), and may be an application that runs on a web browser. A plurality of client PCs 102, which are not illustrated, are connected to a network 103. The network 103 is the Internet, an intranet, or the like. Network-capable devices (101, 102, and so forth) are connected to the network 103. The document management server 101 also provides a web service that publishes the document management services on the Internet or an intranet via the network 103. When the network 103 is the Internet, the document management server 101 may be configured to be provided as a cloud service. As in a typical cloud service configuration, in the system configuration for this case, document management services may be provided by using a virtual server on a cloud, and a detailed description of the cloud service configuration is therefore omitted.

Figure 2:
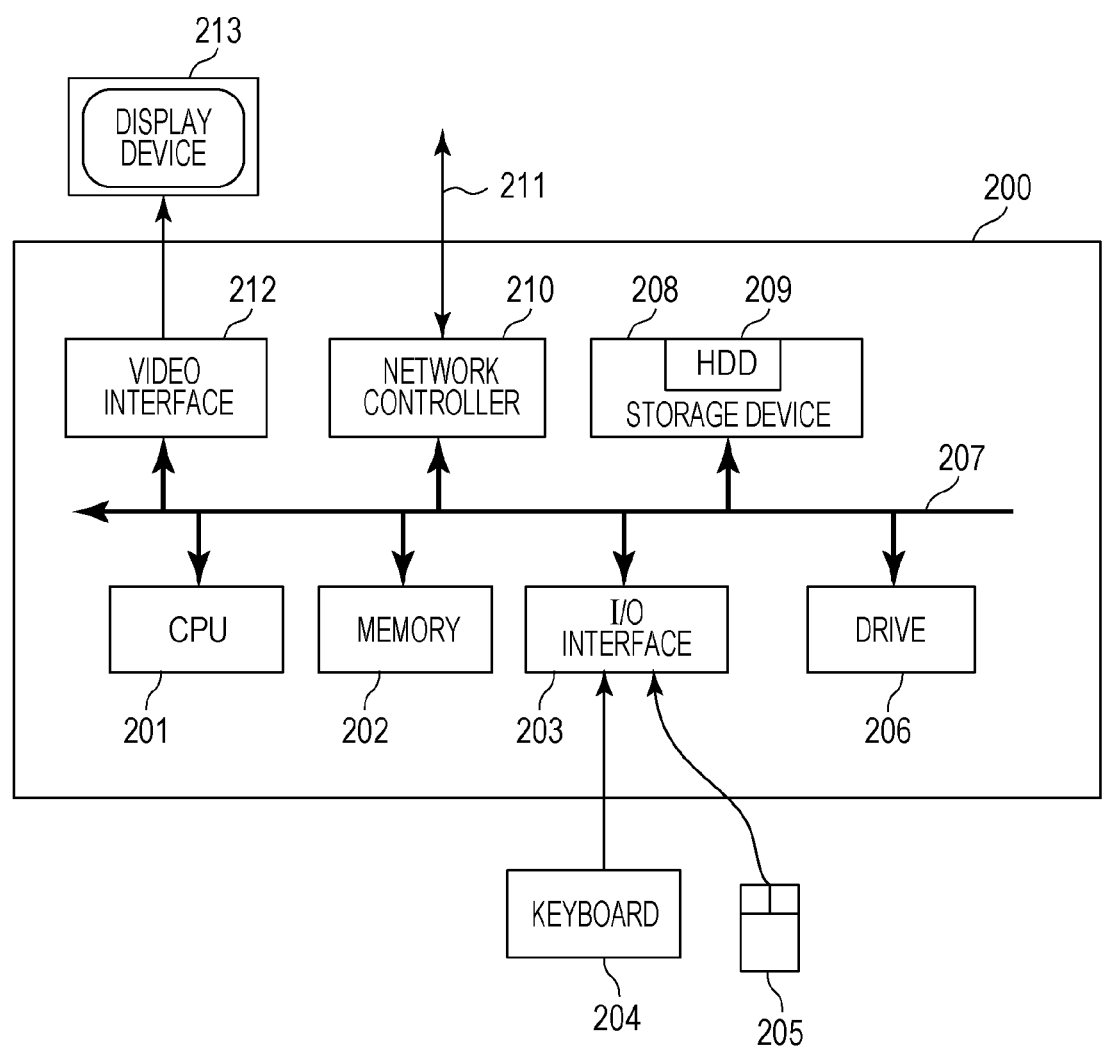
FIG. 2 illustrates a modular configuration of a computer.

FIG. 2 is a block diagram illustrating the configuration of a typical general-purpose computer module 200 according to the first embodiment. The respective hardware configurations of the document management server 101 and the client PC 102 may be implemented by using the typical general-purpose computer module 200. Input devices, such as pointing devices like a keyboard 204 and a mouse 205, and an output device, such as a display device 213, are connected to the general-purpose computer module 200.

A central processing unit (CPU) 201 is constituted by at least one processor, executes processes in flowcharts to be described by executing a computer program stored in a computer-readable storage medium, and controls an entire computer. A memory 202 is constituted by a random access memory (RAM) or a read only memory (ROM). A video interface 212 outputs an image to the display device 213. An input/output (I/O) interface 203 receives an input through operation of the keyboard 204 or the mouse 205. A storage device 208 is a nonvolatile storage device constituted by a hard disk drive (HDD) 209, a flash memory (silicon drive), or the like. A drive 206 is an optical drive for a compact disc-read only memory (CD-ROM), a digital versatile disk (DVD), or the like, and is used as a nonvolatile data source. An interconnection bus 207 is a bus via which communication between blocks is performed under the control of the CPU 201. A network controller (NC) 210 is connected to the network 103 via a certain network interface 211, and executes a control process for communication with another network device.

Control programs for causing the document management server 101 and the client PC 102 to execute the processes illustrated in the flowcharts to be described are stored in a storing unit, such as the memory 202 or storage device 208 of each of the apparatuses, and executed by the CPU 201 of each apparatus. The document management server 101 has a database for document management, and the database is also constructed on the storage device 208.

Figure 3:
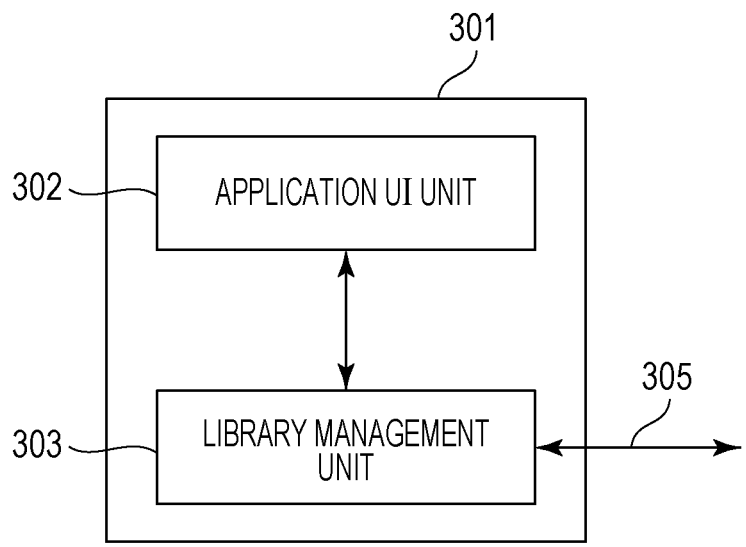
FIG. 3 illustrates a software configuration of a client PC.

FIG. 3 is a block diagram illustrating a software configuration of a document management client application.

An application 301 displays, on a screen of the display device 213, a user interface for executing various functions, receives a request from a user via the keyboard 204 or the mouse 205, and executes processes for the functions. Reference numerals 302 and 303 denote components that constitute the application 301. The component 302 is an application user interface (UI) unit, constructs a user interface, receives various input operations performed by the user, and displays a processing result based on an input operation. The component 303 is a library management unit, manages a library used in the application 301, stores a document in the library, and performs various types of document manipulation, for example, browses, updates, changes attributes of, and searches for documents in the library. The library here is a unit of storage for performing document management, and stores document data, and document management data, such as document attributes. In this embodiment, the library stores a past version of a document and update histories of the document as well. The library management unit 303 passes a request for document manipulation received from the application UI unit 302 to the document management server 101, receives a processing result of the request from the document management server 101, and passes the processing result to the application UI unit 302. A reference numeral 305 denotes an interface for connecting the library management unit 303 to the document management server 101.

Figure 4:
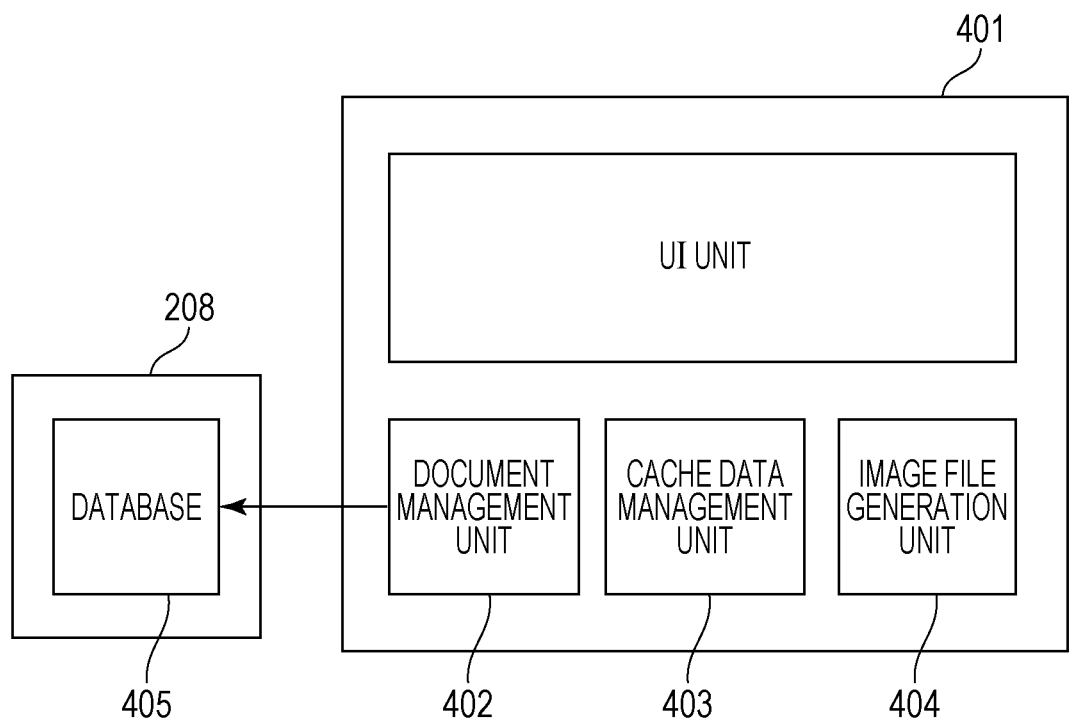
FIG. 4 illustrates a software configuration of a document management server.

FIG. 4 is a block diagram illustrating a software configuration of the document management server 101. Server software 401 includes a UI unit that displays various pieces of information on a user interface for receiving an instruction from an administrator of the server, or a display. A document management unit 402 is a unit that manages a database 405 of documents used in the server software 401, stores a document in the database 405, and acquires a document from the database 405. The database 405 is constructed on the storage device 208, and entity data of a document dealt with by the document management server 101 is accumulated in the database 405.

A cache data management unit 403 accumulates, as cache data, an image file generated by using entity data of a document, and manages the cache data, and thus the cache data may be repeatedly used in response to a request from the user. The structure of cache data management is decided upon by the cache data management unit 403. A cache data storage area is constructed on the storage device 208. In the first embodiment, cache data management is performed by a file system independent of the database 405.

An image file generation unit 404 extracts image data and non-image data from entity data of a document, and keeps the image data unchanged or performs image conversion, such as scaling, of the image data when necessary. As for non-image data, for example, text is converted into a font image and is rendered as image data, and vector-format data is rendered as image data in accordance with an output size. Then, these pieces of data are combined and thereby converted into an image file in a file format in which the content of the document may be displayed in a browser of the client PC 102. In this embodiment, the image file generation unit 404 is capable of calculating the total number of pages of display image data from an entity file of a document, and generates image files corresponding to pages.

Figure 5:
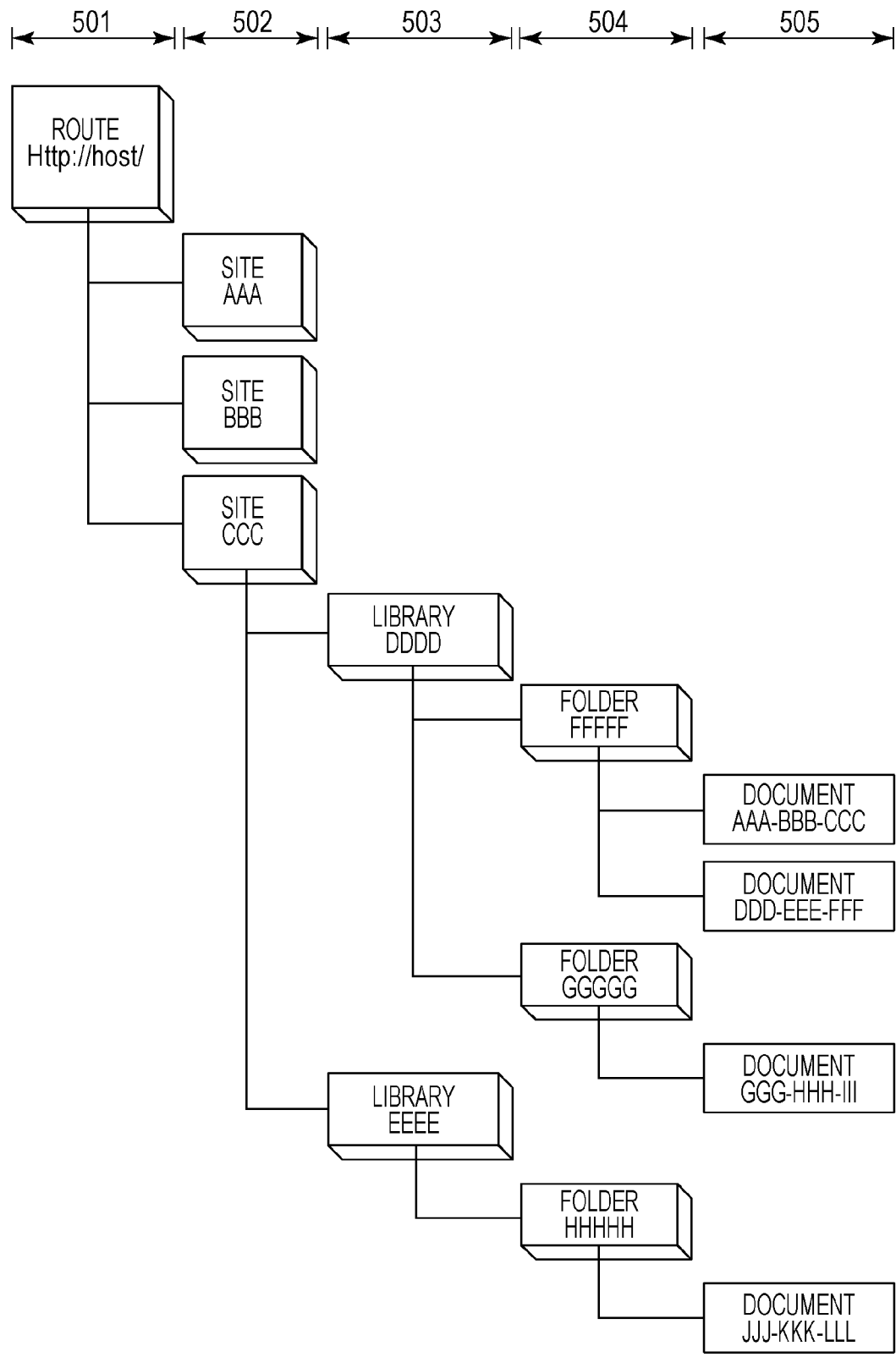
FIG. 5 illustrates an example of a document management structure.

FIG. 5 is a block diagram illustrating an example of a management structure of documents stored in the storage device 208 of the document management server 101 (a hierarchy of document management in a database). At the top level, there exists a topmost layer 501 in which management settings for enabling a system administrator to provide the same operation and a security policy to users are shared. Under the topmost layer 501, there exist a second layer 502 in which the uniqueness of a document is guaranteed, and a third layer 503 in which the same document attribute information (the same attribute item) is shared. Furthermore, under the third layer 503, there are arranged folders 504 for storing documents, and documents 505.

In this embodiment, the document management server 101 provides a web service, and a network address for accessing the topmost layer 501 is assigned to the document management server 101. Identification codes (hereinafter referred to as site IDs) for uniquely identifying, in the topmost layer 501, sites in the second layer 502 are assigned to the sites. In addition, identification codes (hereinafter referred to as document IDs) for uniquely identifying, in each site in the second layer 502, documents arranged in a layer under the site are assigned to the respective documents. Thus, all the documents may be uniquely identified by combinations of the network address, the site IDs, and the document IDs.

For example, in the case where a document management system is operated in a company, an area accessible by users may be determined as follows. For example, in the second layer 502, sites (AAA, BBB, CCC) are assigned to departments in the company, and in the third layer 503, libraries (DDDD, EEEE) are assigned to sections in each department. Users belonging to each section are authorized to access the folders 504 and the documents 505 existing under each library. The same type of documents are often shared in each section. For this reason, attribute items predefined in the section are set, attribute values corresponding to the attribute items are respectively associated with documents, and the documents are registered, thereby facilitating a search for each document.

Figure 6:
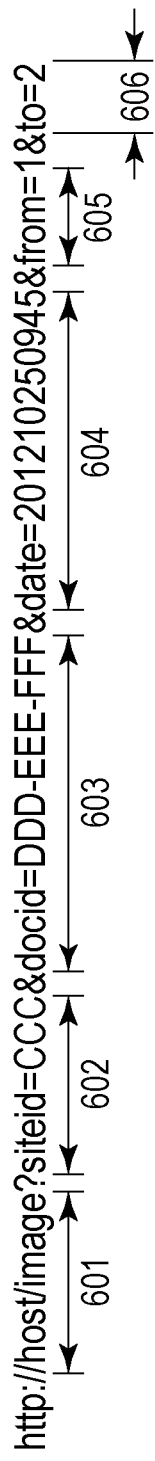
FIG. 6 illustrates an example of a URI used when the client PC makes a request for display of an image of a document.

FIG. 6 illustrates an example of a uniform resource identifier (URI) used when a request for display of an image of a document is made from the application 301 that runs on the client PC 102 to the document management server 101. Authority and path components 601 include a network address for identifying the topmost layer 501 and a path of an object for requesting the image. A query component include the following elements. That is, there are included a query 602 for designating a site ID in the second layer 502, a query 603 for designating a document ID, a query 604 for designating an update date and time, which is attribute information of the document, a query 605 for designating the page number of the first page desired to be displayed, and a query 606 for designating the page number of the last page desired to be displayed. As described in the description of FIG. 5, in order to identify a document, information for identifying the third layer 503 or folders under the third layer 503 does not have to be included. In this embodiment, a request is written in a URI format; however, the technique for implementing this embodiment is not limited to this. Any format may be employed as long as it is stipulated between the application 301 and the document management server 101 and includes elements corresponding to 601 to 606.

Figure 7:
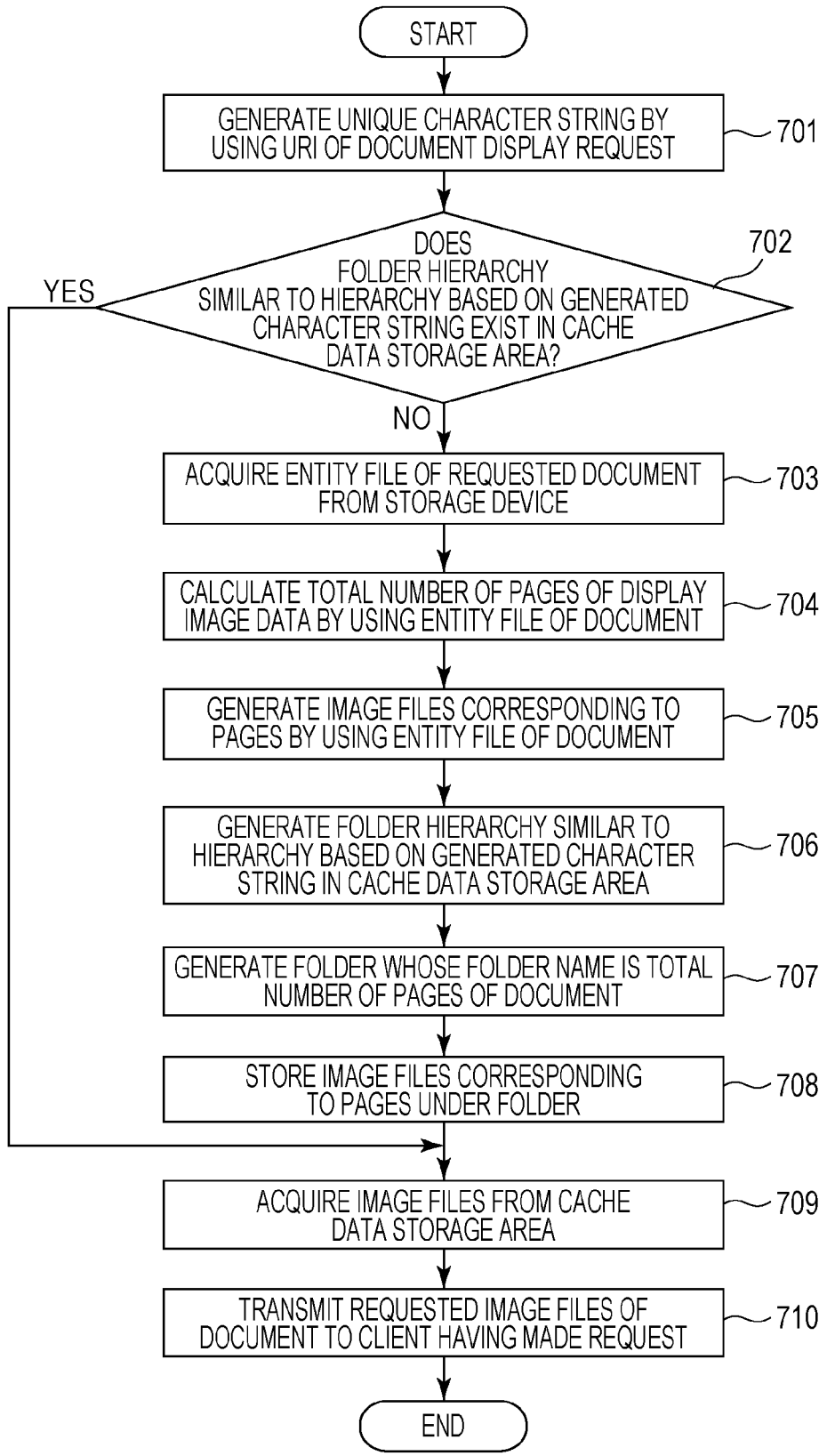
FIG. 7 is a flowchart illustrating a process in which image files are transmitted in response to a request.

FIG. 7 is a flowchart illustrating a process in which the document management server 101 transmits image files of a document in response to a request (a document display request), such as the request illustrated in FIG. 6, received from the client PC 102.

In step 701, the cache data management unit 403 generates a unique character string for identifying a document by using a URI of a document display request, such as the request illustrated in FIG. 6, received from the client PC 102. A detailed description of a character string to be generated will be provided below together with a description of FIG. 8.

In step 702, the cache data management unit 403 determines whether or not a folder hierarchy similar to a hierarchy identified by using the character string generated in step 701 exists in the cache data storage area on the storage device 208. When the folder hierarchy exists, the process flow proceeds to step 709, and when no folder hierarchy exists, the process flow proceeds to step 703. A specific example of the determination process in step 702 will be described later.

In step 703, the document management unit 402 executes an entity file acquisition process of acquiring, from the database 405, an entity file of the document (entity data of the document) requested from the client PC 102. As described in the description of FIG. 6, the document is uniquely identified by using the URI for requesting an image.

In step 704, the image file generation unit 404 calculates the total number of pages of display image data by using the entity file of the document acquired in step 703.

In step 705, the image file generation unit 404 generates image files corresponding to pages by using the entity file of the document acquired in step 703.

In step 706, the cache data management unit 403 generates, immediately under a top folder in the cache data storage area of the storage device 208, a folder hierarchy in which the structure of the folder hierarchy and folder names are similar to those based on the character string generated in step 701.

In step 707, the cache data management unit 403 generates, under a folder in a bottommost layer among folders generated in step 706, a folder whose folder name is a character string representing the total number of pages of the display image data of the document calculated in step 704.

In step 708, the cache data management unit 403 stores, as cache data, the image files corresponding to the pages generated in step 705 under the folder generated in step 707. At this time, the file names of the image files corresponding to the pages are the page numbers of the respective pages. A description of the folder hierarchy constructed in the cache data storage area of the storage device 208 through the processes in steps 706 to 708 will be provided below together with a description of FIG. 9.

In step 709, the cache data management unit 403 acquires, from the cache data storage area of the storage device 208, image files of the document corresponding to pages requested from the client PC 102. In step 710, the document management server 101 transmits the image files acquired in step 709 to the client PC 102.

Figure 8:
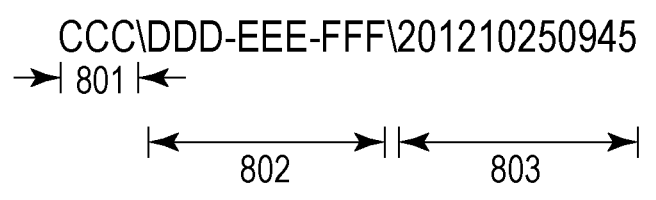

FIG. 8 illustrates an example of a character string to be generated in step 701 for identifying a document in a folder hierarchy. A block 801 includes a site ID designated by the query 602. A block 802 includes a document ID designated by the query 603. A block 803 includes an update date and time of the document designated by the query 604. The blocks are connected to each other using a path separator character (for example, "\" in FIG. 8) for writing the folder hierarchy. As long as the document is able to be identified as in a URI of a request, the character string in FIG. 8 does not have to include information for identifying the third layer 503 or folders under the third layer 503. Thus, the character string in FIG. 8 does not represent a hierarchy like that illustrated in FIG. 5 directly.

Figure 9:
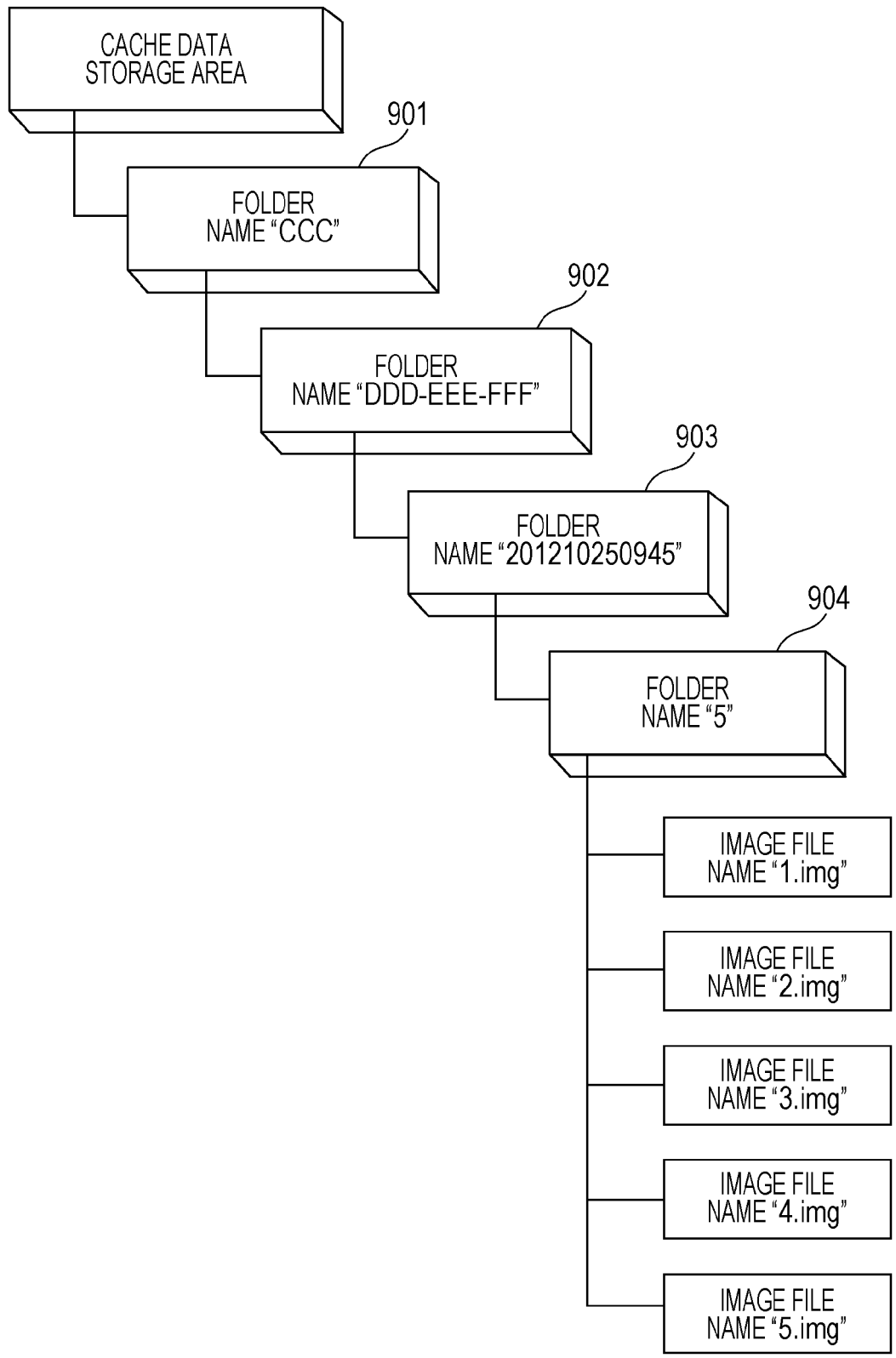
FIG. 9 illustrates a folder hierarchy in a cache data storage area.

FIG. 9 illustrates a folder hierarchy in the cache data storage area in which image files have been stored as cache data through the processes in steps 703 to 708. A hierarchy under the top folder in the cache data storage area is generated by using the character string illustrated in FIG. 8 generated in step 701. This hierarchy includes a folder 901 whose folder name is the site ID indicated in the block 801, a folder 902 whose folder name is the document ID indicated in the block 802, and a folder 903 whose folder name is the update date and time of the document indicated in the block 803. The folders 901 to 903 are generated through the process in step 706. In addition, immediately under the folder 903, a folder 904 whose folder name is a character string representing the total number of pages of the document is generated through the process in step 707. Because the total number of pages in a specific update date and time version of a specific document is uniquely identified, one folder 904 is generated immediately under the folder 903 at all times. Through the process in step 708, image files corresponding to pages of the document are stored in the folder 904. As described above, the file names of the image files are the page numbers of the respective pages. The folder hierarchy in the cache data storage area illustrated in FIG. 9 is not the same as the hierarchy illustrated in FIG. 5 because the folder hierarchy is generated by using the character string illustrated in FIG. 8.

Here, a determination technique in step 702 for determining whether or not image files have been cached in the cache data storage area will be described with reference to FIGS. 8 and 9. The character string illustrated in FIG. 8 generated in step 701 is referred to by using the URI illustrated in FIG. 6, and it is determined whether or not the folder 901 corresponding to the block 801, the folder 902 corresponding to the block 802, and the folder 903 corresponding to the block 803 exist in the cache data storage area. At this time, when cache data has not been stored yet, no folders included in an appropriate hierarchy are supposed to have been generated in the cache data storage area. That is, the determination as to whether or not cache data has already been stored may be made by using a determination as to whether or not the folders 901 to 903 whose names correspond to the character string illustrated in FIG. 8 exist. When the folders whose names correspond to the character string exist and it is determined that cache data has already been stored, the only one folder 904 also exists immediately under the folder 903. In step 709, among the image files in the folder 904, image files whose file names are the page numbers of the pages designated by the query 605 and the query 606 are acquired.

As described above, according to the first embodiment, since it may be determined, by using the folder hierarchy generated in the cache data storage area, whether or not cache data has already been stored, a table for determining the presence or absence of cache data as in Japanese Patent Laid-Open No. 2000-076257 does not have to be prepared. Furthermore, the presence or absence of cache data may be determined without a table and by using the folder hierarchy in the cache data storage area, thereby enabling a quick response.

Second Embodiment

As described in the description of FIG. 5 in the first embodiment, document IDs which are uniquely identified in each site in the second layer 502 are assigned to documents, respectively. Thus, immediately under the folder 901 in FIG. 9, there is a possibility that the same number of folders at the maximum as the number of all documents stored in a layer lower than the site CCC in the second layer 502 may be generated. In typical file systems, in many cases, there is an upper limit to the number of subfolders that are able to be generated under one certain folder. Hence, it is expected that the number of documents stored in the layer lower than the second layer 502 grows significantly and exceeds the upper limit. In a second embodiment, a technique for solving the above problem and also obtaining an effect similar to that in the first embodiment will be described.

Figure 10:
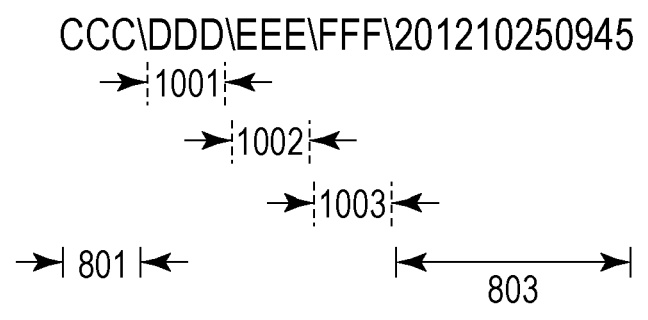

FIG. 10 illustrates another example of a character string to be generated in step 701 for identifying a document in a folder hierarchy. A block 801 in FIG. 10 includes a site ID designated by the query 602 as in the block 801 in FIG. 8. The cache data management unit 403 divides a document ID (a document ID composed of 9 alphabetical characters and hyphens for separating the alphabetical characters by three characters) designated by the query 603 into three groups each composed of three alphabetical characters by removing the hyphens. In FIG. 10, a block 1001, a block 1002, and a block 1003 each include three alphabetical characters of the respective divided groups. The number of characters by which the document ID is divided is not limited to three, and the document ID may be divided in accordance with a predetermined criteria. A block 803 in FIG. 10 includes an update date and time of the document designated by the query 604 as in the block 803 in FIG. 8. The blocks (801, 1001, 1002, 1003, and 803) in FIG. 10 are connected to each other using a path separator character (\) for writing the folder hierarchy. The document ID is divided, and thus some overlaps may be expected in terms of each of the blocks 1001 to 1003.

Figure 11:
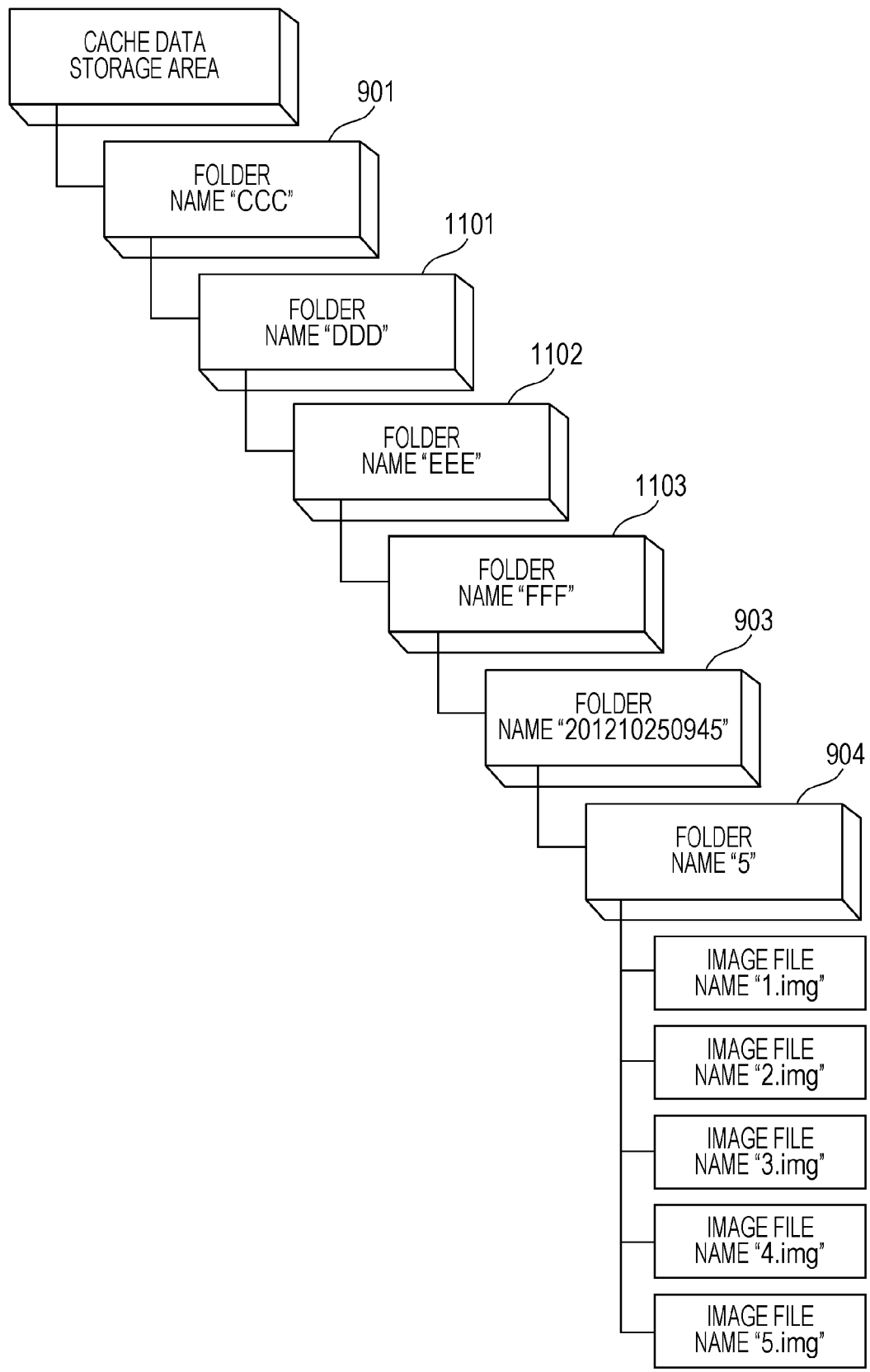
FIG. 11 illustrates another example of a folder hierarchy in the cache data storage area.

FIG. 11 illustrates a folder hierarchy in the cache data storage area in which image files have been stored as cache data through the processes in steps 703 to 708 in the second embodiment. A folder 901 is similar to the folder 901 in FIG. 9. The folder names of folders 1101 to 1103 are respectively the character strings indicated in the blocks 1001 to 1003. A folder 903, a folder 904, and image files generated immediately under the folder 904 are similar to those in FIG. 9.

Figure 12:
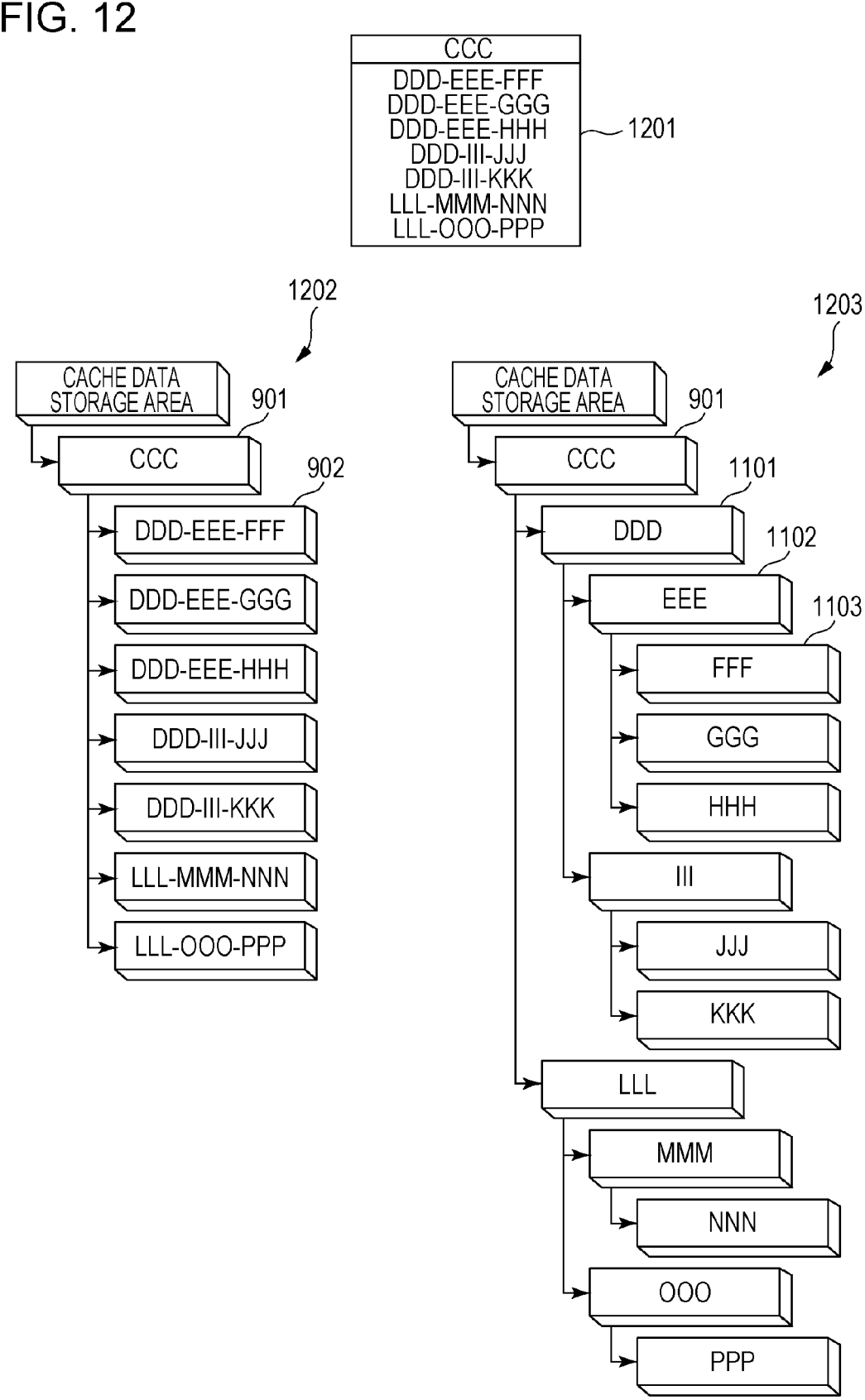
FIG. 12 illustrates a comparison of two examples of a folder hierarchy in the cache data storage area.

FIG. 12 illustrates a comparison between a folder hierarchy 1202 in the cache data storage area generated by using the technique according to the first embodiment and a folder hierarchy 1203 in the cache data storage area generated by using the technique according to the second embodiment. A reference numeral 1201 denotes an example of a list of document IDs of all documents stored in a layer lower than the site CCC in the second layer 502. A reference numeral 1202 illustrates a folder hierarchy in which image files of the documents in the list 1201 have been stored in the cache data storage area by using the technique according to the first embodiment. In the folder hierarchy 1202 in FIG. 12, descriptions of a folder 903 and a hierarchy under the folder 903 are omitted. A reference numeral 1203 illustrates a folder hierarchy in which image files of the documents in the list 1201 have been stored in the cache data storage area by using the technique according to the second embodiment. Similarly, in the folder hierarchy 1203 in FIG. 12, descriptions of a folder 903 and a hierarchy under the folder 903 are omitted. As described above, a document ID is divided by using the technique described with reference to FIG. 10, and thus some overlaps between a plurality of documents may be expected in terms of a character string corresponding to the block 1001. Hence, in the folder hierarchy 1203 in FIG. 12 as an example, a plurality of subfolders are stored immediately under a folder 1101 or a folder 1102. As a result, the number of folders immediately under a folder 901 in the folder hierarchy 1203 is smaller than the number of folders immediately under a folder 901 in the folder hierarchy 1202. On the other hand, the folder hierarchy 1202 and the folder hierarchy 1203 are the same in terms of the number of folders in a layer, which is the end of each hierarchy. Thus, between the folder hierarchy 1202 and the folder hierarchy 1203, there are no differences in terms of the folder 903 and the hierarchy under the folder 903, and no differences in terms of the process of storing and acquiring image files illustrated in FIG. 7 occur.

In the second embodiment, the risk of exceeding a restriction of the number of subfolders in a typical file system is reduced, and thus a document management system that defines a folder hierarchy of cache data capable of dealing with a large number of documents may be provided.

Third Embodiment

In such a document management system as described in the first embodiment, the physical capacity of the storage device 208 that contains the cache data storage area is generally limited. When many image files of documents are generated and stored in response to requests from the client PC 102, the amount of file data is expected to exceed an upper limit of the capacity of the storage device 208. In a third embodiment, a technique for solving the above problem and also obtaining an effect similar to that in the first embodiment will be described.

Figure 13:
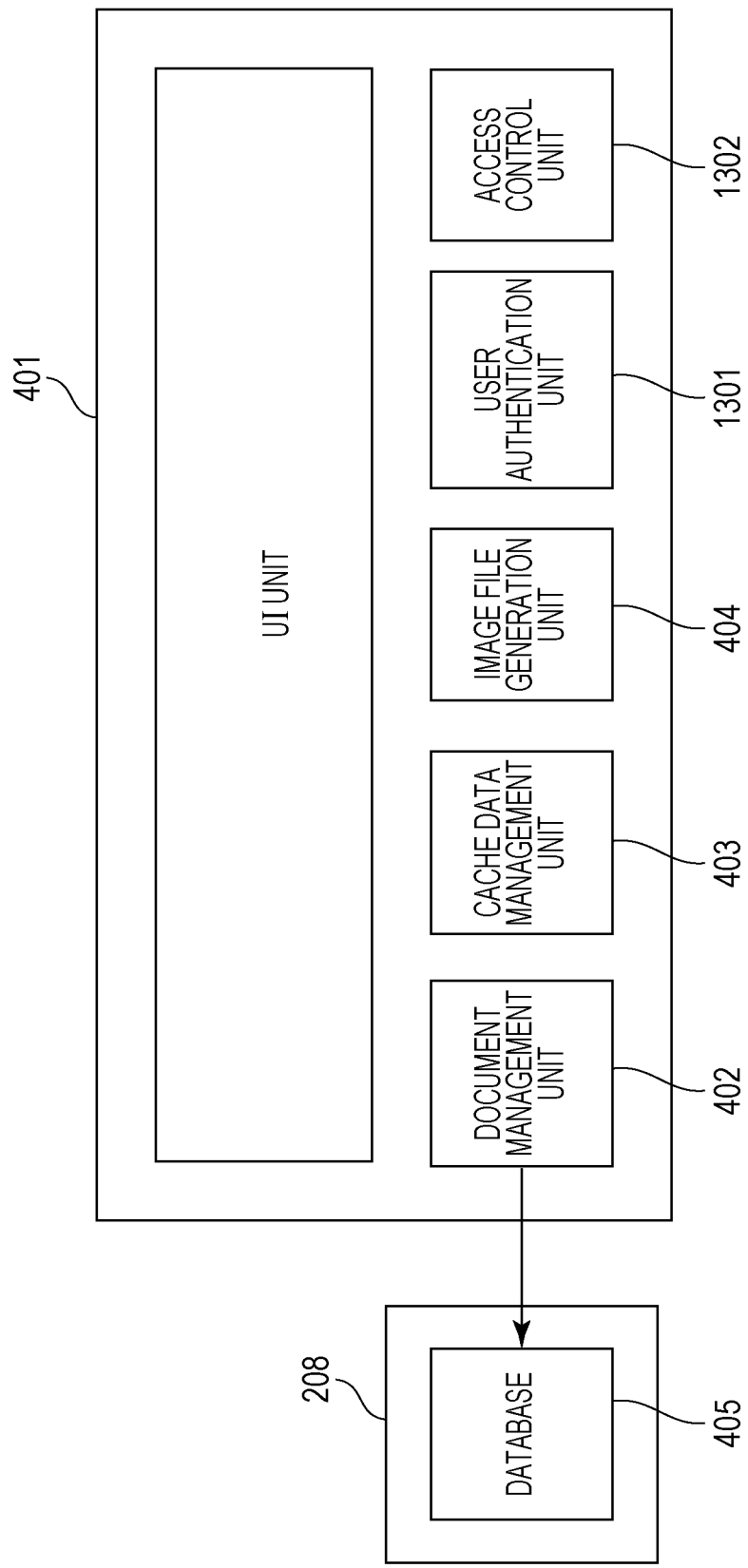
FIG. 13 illustrates another example of a software configuration of the document management server.

FIG. 13 illustrates an example of an extended block diagram illustrating a software configuration of the document management server 101. A user authentication unit 1301 receives typical authentication information, such as a combination of a user ID and a password, from the client PC 102, executes an authentication process of the authentication information, and authorizes the received authentication information. In this embodiment, verification of authentication information (an authentication process) may be either a technique of verifying the authentication information against a user list stored in the document management server 101, or a technique of performing authentication by using an external server. The document management server 101 performs account authentication by using the user authentication unit 1301 at a certain point in time in response to a request from the client PC 102. Until an active disconnection request is received from a user, or until an automatic disconnection defined in the document management server 101 occurs, a request from the client PC 102 is treated as an authorized user's request.

An access control unit 1302 makes a determination as to whether or not it has been authorized to use a resource of the document management server 101 for each of requests from authorized users and how the resource is able to be used (authorization determination). Then, the access control unit 1302 makes, by using a result of the determination, a determination as to whether or not the request is to be accepted and how a function is to be provided in response to the request. In this embodiment, the determination technique may be either a technique of verifying the request against an access control list stored in the document management server 101, or a technique of making a determination by using an external server.

Figure 14:
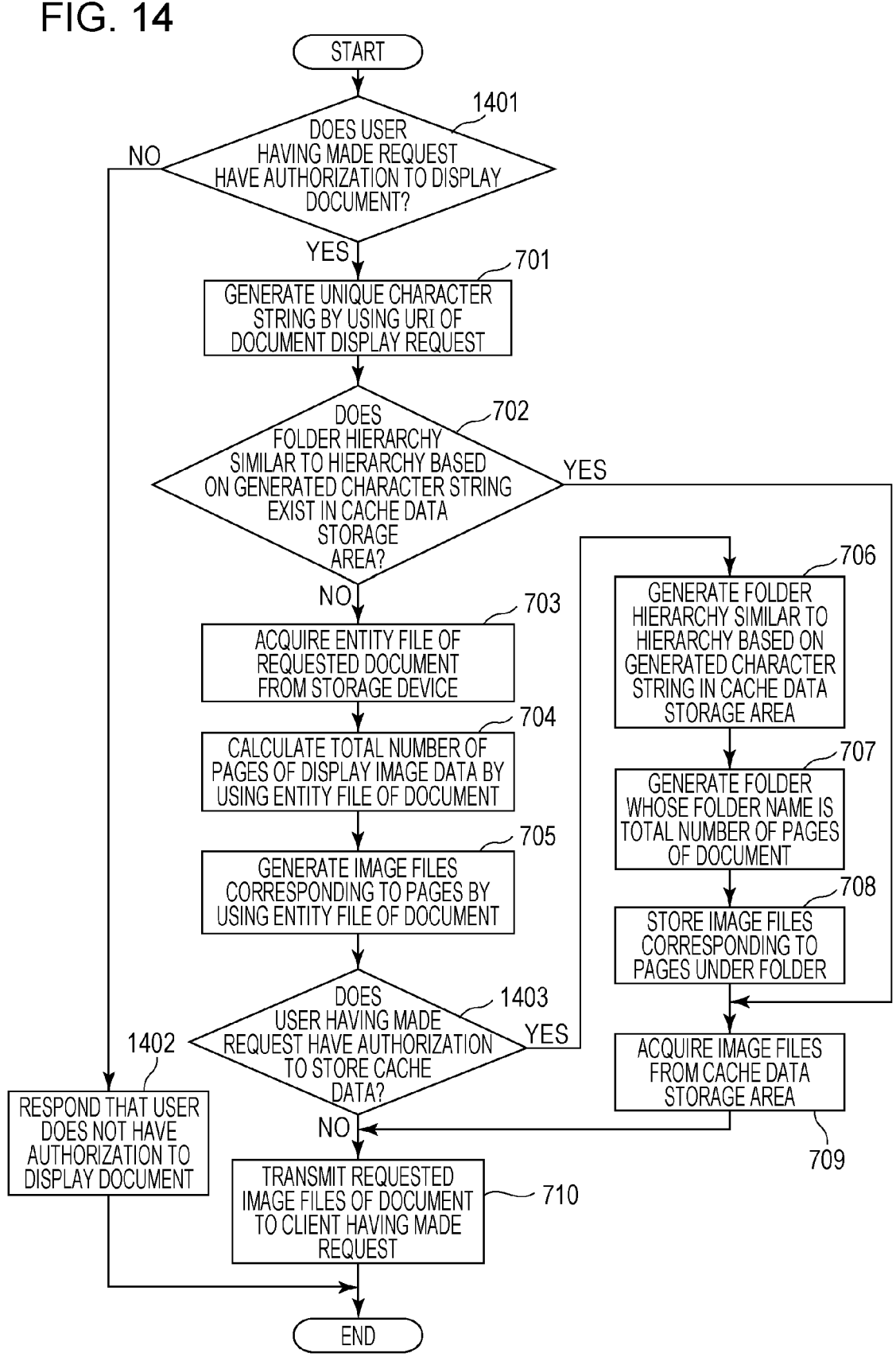
FIG. 14 illustrates another example of a flowchart illustrating a process in which image files are transmitted.

FIG. 14 illustrates another example of a flowchart illustrating a process in which the document management server 101 transmits image files of a document in response to a request (a document display request), such as the request illustrated in FIG. 6, received from the client PC 102. At a starting point in time in the flowchart illustrated in FIG. 14, verification of authentication information performed by the user authentication unit 1301 has been completed, and the request is to be treated as an authorized user's request.

In step 1401, the access control unit 1302 determines whether or not the user having made the request has display authorization to display the document. When the user has the display authorization, the process flow proceeds to step 701, and when the user does not have the display authorization, the process flow proceeds to step 1402. The processes in steps 701 to 710 in FIG. 14 are similar to those in steps 701 to 710 in FIG. 7, and detailed descriptions thereof are omitted.

In step 1402, the document management server 101 transmits, to the client PC 102, a report that the user does not have the display authorization to display the document.

In step 1403, the access control unit 1302 determines whether or not the user having made the request has authorization to store reusable image files as cache data, that is, storage authorization to store image files in the cache data storage area. Through this authorization determination process, when the user has the storage authorization, the process flow proceeds to step 706, and when the user does not have the storage authorization, the process flow proceeds to step 710.

In the third embodiment, when the client PC 102 transmits a document display request to the document management server 101 in accordance with an instruction from the user who does not have the storage authorization to store cache data, image files generated in step 705 are not cached, but transmitted to the client PC 102 in step 710, and discarded.

Authorization to store image files in the cache data storage area may be set for users individually by the administrator of the document management server 101. Alternatively, a process may be performed in which frequency of access or frequency of a document display request from a user is compared with a certain threshold, and storage authorization to store image files in the cache data storage area is automatically assigned to a user for which the frequency exceeds the threshold.

In the third embodiment, users who are able to use the cache data storage area are restricted, and thus a document management system that prevents the amount of file data from exceeding an upper limit of the capacity of the storage device 208 because many image files have been cached may be provided.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-120719 filed Jun. 7, 2013, which is hereby incorporated by reference herein in its entirety.

What is claimed is:

1. A document management server comprising:
a cache data storage area which stores cache data; and
at least one processor which executes a computer program to perform a process comprising steps of:
generating, based on a URI included in a request received from a client, a character string that represents a location in a folder hierarchy in the cache data storage area, wherein the URI indicates a storage location at which an entity file of a requested document is stored, and wherein the URI is different from the location in the cache data storage area represented by the character string, and wherein the folder hierarchy is generated based on groups which are obtained by dividing a document ID included in the URI with a hyphen;

determining whether or not an image file corresponding to the requested document exists at the location in the cache data storage area represented by the character string;

acquiring, in a case that it is determined that no image file corresponding to the requested document exists at the location in the cache data storage area represented by the character string, the entity file of the requested document from the storage location indicated by the URI;

generating an image file corresponding to the requested document by using the acquired entity file;

storing, as cache data, the generated image file at the location in the cache data storage area represented by the character string;

transmitting the stored image file to the client in a case that it is determined that no image file corresponding to the requested document exists at the location in the cache data storage area represented by the character string;

acquiring, in a case that it is determined that the image file corresponding to the requested document exists at the location in the cache data storage area represented by the character string, the image file existing at the location in the cache data storage area represented by the character string; and transmitting the acquired image file to the client in a case that it is determined that the image file corresponding to the requested document exists at the location in the cache data storage area represented by the character string.

2. The document management server according to claim 1,
wherein the determining step is executed by determining whether or not the location in the folder hierarchy represented by the character string exists in the cache data storage area.

3. The document management server according to claim 1,
wherein the generating step generates image files corresponding to pages of the requested document by using the acquired entity file, and
wherein the storing step gives file names, which are page numbers of the respective pages, to the generated image files corresponding to the pages of the requested document, and stores, as the cache data, the generated image files at the location in the cache data storage area represented by the character string.

4. The document management server according to claim 1, wherein the process further comprises:
determining whether or not a user of the client has storage authorization to store the generated image file at the location in the cache data storage area,
wherein, in a case that it is determined that the user does not have the storage authorization, the storing step performs control so that the image file is not stored as cache data.

5. A document management method comprising:
generating, based on a URI included in a request received from a client, a character string that represents a location in a folder hierarchy in a cache data storage area, wherein the URI indicates a storage location at which an entity file of a requested document is stored, and wherein the URI is different from the location in the cache data storage area represented by the character string, and wherein the folder hierarchy is generated based on groups which are obtained by dividing a document ID included in the URI with a hyphen;

determining whether or not an image file corresponding to the requested document exists at the location in the cache data storage area represented by the character string;

acquiring, in a case that it is determined that no image file corresponding to the requested document exists at the location in the cache data storage area represented by the character string, the entity file of the requested document from the storage location indicated by the URI;

generating an image file corresponding to the requested document by using the acquired entity file;

storing, as cache data, the generated image file at the location in the cache data storage area represented by the character string;

transmitting the stored image file to the client in a case that it is determined that no image file corresponding to the requested document exists at the location in the cache data storage area represented by the character string;

acquiring, in a case that it is determined that the image file corresponding to the requested document exists at the location in the cache data storage area represented by the character string, the image file existing at the location in the cache data storage area represented by the character string; and transmitting the acquired image file to the client in a case that it is determined that the image file corresponding to the requested document exists at the location in the cache data storage area represented by the character string.

6. A non-transitory storage medium storing a program for causing a computer to execute a document management method, the method comprising:
generating, based on a URI included in a request received from a client, a character string that represents a location in a folder hierarchy in a cache data storage area, wherein the URI indicates a storage location at which an entity file of a requested document is stored, and wherein the URI is different from the location in the cache data storage area represented by the character string, and wherein the folder hierarchy is generated based on groups which are obtained by dividing a document ID included in the URI with a hyphen;

determining whether or not an image file corresponding to the requested document exists at the location in the cache data storage area represented by the character string;

acquiring, in a case that it is determined that no image file corresponding to the requested document exists at the location in the cache data storage area represented by the character string, the entity file of the requested document from the storage location indicated by the URI;

generating an image file corresponding to the requested document by using the acquired entity file;

storing, as cache data, the generated image file at the location in the cache data storage area represented by the character string;

transmitting the stored image file to the client in a case that it is determined that no image file corresponding to the requested document exists at the location in the cache data storage area represented by the character string;

acquiring, in a case that it is determined that the image file corresponding to the requested document exists at the location in the cache data storage area represented by the character string, the image file existing at the location in the cache data storage area represented by the character string; and transmitting the acquired image file to the client in a case that it is determined that the image file corresponding to the requested document exists at the location in the cache data storage area represented by the character string.

* * * * *